United States Patent
Yu et al.

(10) Patent No.: US 9,591,297 B2
(45) Date of Patent: Mar. 7, 2017

(54) HOLOGRAPHIC LIQUID CRYSTAL DISPLAY, STEREO DISPLAY METHOD, AND STEREO DISPLAY SYSTEM

(71) Applicant: BEIJING BOE OPTOELECTRONICS TECHNOLOGY CO., LTD., Beijing (CN)

(72) Inventors: Yangbing Yu, Beijing (CN); Zhe Shi, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 456 days.

(21) Appl. No.: 14/128,670

(22) PCT Filed: Nov. 30, 2012

(86) PCT No.: PCT/CN2012/085694
§ 371 (c)(1),
(2) Date: Dec. 23, 2013

(87) PCT Pub. No.: WO2013/159524
PCT Pub. Date: Oct. 31, 2013

(65) Prior Publication Data
US 2014/0192173 A1    Jul. 10, 2014

(30) Foreign Application Priority Data
Apr. 25, 2012    (CN) .......................... 2012 1 0125087

(51) Int. Cl.
*G09G 3/36*      (2006.01)
*H04N 13/04*   (2006.01)
(Continued)

(52) U.S. Cl.
CPC ......... *H04N 13/0497* (2013.01); *G03B 35/18* (2013.01); *G09G 3/002* (2013.01);
(Continued)

(58) Field of Classification Search
CPC ........... H04N 13/0488; H04N 13/0495; H04N 13/0497; H04N 13/0459; H04N 2013/0465; G09G 3/36; G03B 35/22
See application file for complete search history.

(56) References Cited

U.S. PATENT DOCUMENTS

2002/0163482 A1* 11/2002 Sullivan ............. G02B 27/2278
                                                                    345/6
2004/0008506 A1*  1/2004 Son ....................... G02B 6/0051
                                                                    362/615
(Continued)

FOREIGN PATENT DOCUMENTS

CN            102654697 A        9/2012

OTHER PUBLICATIONS

First Office Action issued by the Chinese Patent Office for Chinese Patent Application No. 2012101250876 issued Feb. 27, 2014.
(Continued)

*Primary Examiner* — Premal Patel
(74) *Attorney, Agent, or Firm* — Banner & Witcoff, Ltd.

(57) ABSTRACT

A holographic LCD stereo display system is disclosed. The holographic LCD stereo display system comprises: a holographic projection device (11), a signal synchronous generator (12) and a holographic LCD having multiple layer of LCD panels. In the system, the holographic projection device (11) decomposes a stored holographic stereo image to obtain decomposes images and projects the decomposed images to the holographic LCD (13) in sequence; the holographic LCD (13) controls, according to a synchronous signal received from the signal synchronous generator (12), the multiple layers of LCD panels to display projected decomposed images in sequence; and when a frequency at which the holographic LCD (13) displays the decomposed images is not less than 46 Hz, with visual persistence effect of human eyes, the decomposed images become real three-
(Continued)

dimensional stereo images in human brains, so that the holographic stereo three-dimensional images are presented stereo images in the holographic LCD (13), thereby achieving an effect of vividly displaying real naked-eye three-dimensional images. Further disclosed are a holographic LCD and a stereo display method.

6 Claims, 5 Drawing Sheets

(51) Int. Cl.
    *G03B 35/18*     (2006.01)
    *G09G 3/00*     (2006.01)
    *G02F 1/1347*     (2006.01)

(52) U.S. Cl.
    CPC ............... *G09G 3/003* (2013.01); *G09G 3/36* (2013.01); *G09G 3/3618* (2013.01); *H04N 13/0459* (2013.01); *G02F 1/13471* (2013.01); *G09G 2300/023* (2013.01)

(56) References Cited

U.S. PATENT DOCUMENTS

2012/0270649 A1* 10/2012 Griswold ........... G02B 27/2278
    463/31
2012/0319967 A1* 12/2012 Tsai ....................... G06F 1/1626
    345/173

OTHER PUBLICATIONS

English translation of First Office Action issued by the Chinese Patent Office for Chinese Patent Application No. 2012101250876 issued Feb. 27, 2014.
International Search Report for International Application No. PCT/CN2012/085694 issued Feb. 8, 2013, 13pgs.
PCT International Preliminary Report on Patentability, for International Application No. PCT/CN2012/085694, issued Oct. 28, 2014, 8 pgs.

* cited by examiner

HOLOGRAPHIC LIQUID CRYSTAL DISPLAY, STEREO DISPLAY METHOD, AND STEREO DISPLAY SYSTEM

CROSS REFERENCE TO RELATED APPLICATIONS

This application is based on International Application No. PCT/CN2012/085694 filed on Nov. 30, 2012, which claims priority to Chinese National Application No. 201210125087.6 filed on Apr. 25, 2012, the contents of which are incorporated herein by reference.

TECHNICAL FIELD

Embodiments of the present invention relate to the three-dimensional display stereo imaging technology, particularly to a holographic liquid crystal display (LCD), a stereo display method and a stereo display system.

BACKGROUND

Three-dimensional display technology is a display technique that forms an effect of three-dimensional display in one's brain through inducing a visual aberration between two eyes of a person by a series of optical methods so that the images received by the eyes are different. The currently commonly-used stacked liquid crystal three-dimensional display technology comprises the following two types:

Three-Dimensional Display of Brightness Modulation

In a three-dimensional display, two pieces of two-dimensional display are disposed at a predetermined dispositional interval in a viewing direction of a viewer, wherein the display closer to the viewer are of both self-illuminated and transmissive so that light from its backside can go through it. The last display farther from the viewer does not need to be of transmissive and thus the last display can utilize a LCD unit, a plasma display unit, a CRT display unit and the like. Under the control of a controller, the display displays corresponding images of a same object (e.g. the size of the same object on a corresponding image of the two displays can be the same or different) on substantially the corresponding screen position of each of the displays, respectively. The two displays are of different brightness. Therefore, for a viewer, an image displayed by a display disposed at the front position overlaps an image displayed by a display disposed at the back position. That is, a viewer may spot a brightness-modulated 3D image along the direction of sight.

The above-mentioned three-dimensional displays make up a position separating interval between the two two-dimensional images just by changing the image brightness on the two two-dimensional displays so as to produce a three-dimensional image by overlapping and combining two two-dimensional images. However, when displaying an image by the three-dimensional display, it is neither possible to display a semi-transparent object image, nor possible to display an image of the back of an object, and further the 3D viewing angle for a viewer is confined in specific positions so that the effect of such three-dimensional display is undesirable.

Three-Dimensional Display of a Plurality of Liquid Crystal Displays Stacked

The said three-dimensional display includes a plurality of liquid crystal display screens that are stacked. Each display screen is composed of a glass substrate, transparent electrodes and a liquid crystal layer. The liquid crystal layers of each liquid crystal display screen are driven by a driver circuit to display different images, so as to form a three-dimensional image. However, when displaying an image by the three-dimensional display, as individual liquid crystal display screens are not correlated and each liquid crystal screen displays its own corresponding picture respectively, what is seen is merely overlapped images of pictures displayed on each liquid crystal screen, which has a poor three-dimensional effect. And moreover, since each of the single liquid crystal screens has no color film and thus it cannot display a colored image, it is just possible to adjust grayscale of an image, which further causes the three-dimensional display effect undesirable.

SUMMARY

The present disclosure discloses a holographic liquid crystal display (abbreviated as LCD). The holographic LCD comprises a layer-by-layer scan synchronization driver circuit and multiple LCD panels. The layer-by-layer scan synchronous driver circuit determines refresh frequency at which the decomposed images obtained by decomposing a holographic stereo image is projected, controls the multiple LCD panel to display in sequence the decomposed images projected, and according to the refresh frequency and in one refresh period, controls only one of the multiple LCD panels to display the decomposed image projected and the other panels of the multiple LCD panels to be in a fully transmissive state. Under control of the layer-by-layer scan synchronization driving circuit, the LCD panel displays the decomposed images projected or is in the fully transmissive state.

In an example, a light guide film plate is interposed between adjacent two panels in the multiple LCD panels.

In an example, each of the multiple LCD panels is respectively connected to the layer-by-layer scan synchronous driver circuit through a flexible printed Circuit Board (abbreviated as FPC).

In an example, the layer-by-layer scan synchronous driver circuit comprises: a synchronous signal receiver for receiving a synchronous signal, signal frequency of which is the refresh frequency at which the decomposed images obtained by decomposing the holographic stereo image is projected; a timing controller which generates a control signal to control whether each panel of the multiple LCD panels is powered on or not, according to the refresh frequency, wherein the panels of the multiple LCD panels powered on are in the fully transmissive state, while the panel of the multiple LCD panels powered off is able to display the decomposed image projected; and a level shifter controlling whether each panel of the multiple LCD panels is powered on or not according to the control signal.

In an example, the control signal comprises: a start layer signal which starts layer-by-layer scan at the rising edge; a clock pulse layer signal which triggers the LCD panel to be powered off at the rising edge; an output enable layer signal which allows the LCD panel to be powered off at low level; and a layer ON signal which allows the LCD panel to be powered off at high level.

In an example, the method comprises: the holographic LCD receiving a synchronous signal from a synchronous signal generator, the signal frequency of the synchronous signal being refresh frequency of projecting decomposed images obtained by decomposing the holographic stereo image; a holographic projection device decomposing the holographic stereo image stored to obtain the decomposed images projecting the decomposed images onto the holographic LCD sequentially; and the holographic LCD controlling multiple LCD panels to display sequentially the decomposed images projected, according to the refresh frequency.

In an example, the synchronous signal can carry an identifier information that indicates finish of projecting all the decomposed images obtained by decomposing the holographic stereo image, or an identifier information that indicates start of projecting the decomposed images obtained by decomposing the holographic stereo image; the holographic LCD controlling multiple LCD panels to display sequentially the decomposed images projected according to the refresh frequency comprises: upon receiving any of the identifier information, the holographic LCD determining the corresponding number of the LCD panels based on the number of the decomposed images belonging to the same holographic stereo image that needs to be displayed subsequently and controlling the determined LCD panels to display in sequence the decomposed images projected, according to the refresh frequency.

In an example, the holographic LCD controlling the determined LCD panels to display in sequence the decomposed images projected comprises: controlling a panel of the LCD panel to display the decomposed image projected by the holographic projection device, while the holographic LCD controlling other panels of the LCD panels of the holographic LCD to be in a fully transmissive state; and while the holographic projection device refreshes the decomposed images projected according to the refresh frequency, the holographic LCD controlling the LCD panel which is currently displaying the decomposed image to enter the full transmissive state and controlling a panel of the LCD panels behind the LCD panel which is currently displaying the decomposed image to display the decomposed image refreshed.

In an example, the refresh frequency is no less than 46 Hz.

In an example, the system includes: a holographic projection device which stores the decomposed images obtained by decomposing a holographic stereo image and projects the decomposed images sequentially; a synchronous signal generator which sends a synchronous signal, signal frequency of which being the refresh frequency at which the holographic projection device projects the decomposed images; and a holographic LCD device having multiple LCD panels, the holographic LCD device controlling the multiple LCD panels to display in sequence the decomposed images projected, and in a refresh period, controlling only one panel of the multiple LCD panels to display the decomposed image projected and other panels of the multiple LCD panels to enter a fully transmissive state, according to the refresh frequency of the synchronous signal received; the number of the multiple LCD panels of the holographic LCD no less than the number of the decomposed images obtained by decomposing a holographic stereo image.

In an example, the synchronous signal carries an identifier information that indicates finish of projecting all the decomposed images obtained by decomposing the holographic stereo image, or an identifier information that indicates start of projecting the decomposed images obtained by decomposing the holographic stereo image; and upon receiving any of the identifier information, based on the number of the decomposed images belonging to the same holographic stereo image that needs to be displayed subsequently, the holographic LCD determines the same number of the LCD panels and controls the determined LCD panel to display the decomposed images to be projected next.

BRIEF DESCRIPTION OF THE DRAWINGS

To more clearly illustrate technical solutions of the present disclosure and the conventional arts, now it is intended to simply introduce the figures needed by the description of technical solutions of the present disclosure and the conventional arts. Obviously, the following figures are illustrations of parts of specific embodiments of technical solutions of the present disclosure and for a common person skilled in the art, it is possible to obtain other figures based on the following figures without creative works.

DETAILED DESCRIPTION

The following will describe the technical solutions of the present embodiments clearly and thoroughly with referring to figures of the embodiments of the present disclosure. Obviously, the embodiments described herein are merely a part of embodiments of the present disclosure, rather than all the embodiments. Based on the embodiments of the present disclosure, all the other embodiments obtained by those skilled in the art without any creative work fall into the protection scope of the present disclosure.

Embodiments of the present disclosure propose a technical solution to realize three-dimensional display using holographic technology, wherein a holographic stereoimage obtained by holographic technology is decomposed into N (N is a integer greater than 1) pieces of decomposed images in a certain order, and the N pieces of decomposed images are projected onto the holographic liquid crystal display (LCD) in order using the holographic projection device. Since the holographic LCD comprises multiple LCD panels (the number of the panels is no less than N), one LCD panel displays a piece of decomposed image and then goes into a fully transmissive state in order that the following adjacent LCD panel may continue to display a next decomposed image projected thereon. The following LCD panels goes into the fully transmissive state after displaying the next decomposed image, and in this way, N pieces of decomposed images are displayed on the N LCD panels respectively in a layer-by-layer manner. Since the multiple LCD panels of the holographic LCD can display the actual physical depth of the holographic stereo image, when the holographic projection device refresh at a frequency no less than 46 Hz a piece of decomposed image projected, that is, when the frequency at which the holographic LCD sequentially displays the decomposed images is no less than 46 Hz, a real three-dimensional stereo image is generated in brains due to visual persistence, thus a vivid effect of displaying a real naked-eye three-dimensional image is obtained.

Now embodiments of the present disclosure will be described in details with referring to the figures of the specification.

First Embodiment

Figure 1:
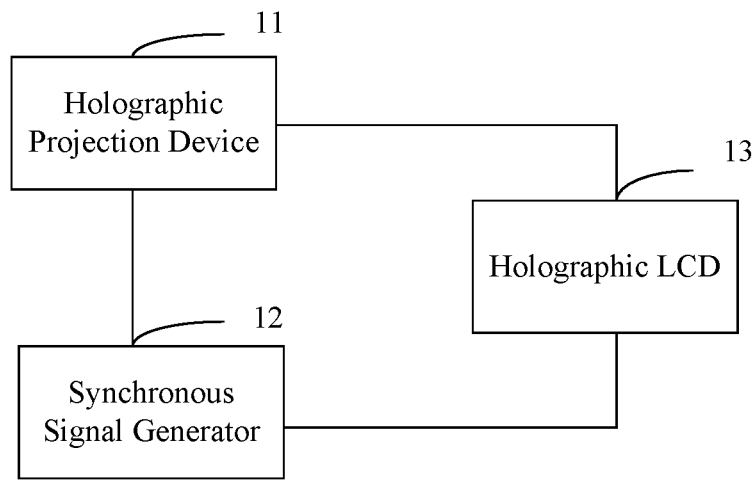
FIG. 1 is a schematic diagram of a holographic LCD stereo display system according to a first embodiment of the disclosure.

FIG. 1 is a schematic diagram of a holographic LCD stereo display system according to the first embodiment of the present disclosure. As illustrated in FIG. 1, the system comprises a holographic projection device 11, a synchronous signal generator 12 and a holographic liquid crystal display 13. The holographic projection device 11 is used for storing decomposed images obtained by decomposing a holographic stereo image, and projects the stored decomposed images onto LCD panels of the holographic LCD 13 in order.

The decomposed images stored in the holographic projection device 11 refer to N pieces of decomposed images obtained by decomposing a piece of holographic stereo image in certain order, the N pieces of decomposed images record all the information of the holographic stereo image and they can form a piece of holographic stereo image when combined together.

The holographic stereo image can be decomposed into N pieces of decomposed images in the following two ways:

The First Way of Decomposing

In this way, a depth-of-field (DOF) processing circuit module is introduced into an image processing circuit at the front end of the holographic synchronous projector. The DOF processing circuit module, based on a DOF arithmetic, deduces changes in the DOF of the holographic stereo image from front to back, arranges a displaying order from front to back, and determines grayscale and color of each frame of pictures, and further separating N frames of images and realizing smooth and harmonious transition of adjacent frames of the images, i.e. from the n-th (n is an integer greater than 1, n<N) frame to the (n+1)-th frame of the image.

The Second Way of Decomposing

In this way, a signal source is image information already decomposed. When recording information of three-dimensional images, layer-by-layer scan is performed, and image information obtained by scanning respective panel i.e. the n-th panel (n is an integer no more than N) is recorded. The decomposed and recorded image information of N panels is stored in a dynamic random access memory (DRAM) of the holographic projector.

The number N and the sequence of the decomposed images N obtained by decomposing each frame of the holographic stereo image can be determined according to actual display requirements, for example, decomposing the holographic stereo image along the direction of sight in the sequence from front to back according to a certain viewing angle.

For a intermittent light with a period composed of a bright time phase and a dark time phase, when the frequency is low, the viewer sees a series of flash lights: when the frequency increases, they becomes a thick flash, a thin flash; until the flash light increases to a certain frequency so that human eyes won't see flash lights but a constant or continuous light. This certain frequency which is called the flicker fusion frequency or the critical flicker frequency (simply referred to as CFF), is an index for characterizing the ability of the human eyes to distinguish the photostimulation time. Obtained from the empirical formula, the critical flicker frequency of the human eyes is approximately 46 Hz.

Therefore, when the holographic projection device 11 projecting the decomposed images, the decomposed images obtained by decomposing a holographic stereo image is refreshed and projected at a frequency no less than 46 Hz. In order to obtain a better visual effect, the commonly used frequency for display is 50 Hz or 60 Hz.

Said holographic projection device 11 can communicate with the synchronous signal generator 12, so that the synchronous signal generator 12 can obtain the refresh frequency when the holographic projection device 11 projects the decomposed images. For example, the holographic projection device 11 can send synchronous control information which carries the refresh frequency, to the synchronous signal generator 12 in real-time, or otherwise, can send synchronous control information to the synchronous signal generator 12 initially, requiring the synchronous signal generator 12 to store the refresh frequency locally.

The synchronous signal generator 12 sends a synchronous signal to the holographic LCD 13 after obtaining the refresh frequency of the holographic projection device projecting the decomposed images, such that the projecting operation of the holographic projection device 11 synchronizes with the display operation of the holographic LCD 13, with the signal frequency of the synchronous signal being the refresh frequency of the holographic projection device projecting the decomposed image.

The synchronous signal generator 12 can send a synchronous signal which may be an infra-red signal to the holographic LCD 13.

The synchronous signal can carry an identifier information that projection of all the decomposed images obtained by decomposing a piece of holographic stereo image finishes, or an identifier information that projection of the decomposed images obtained by decomposing a piece of holographic stereo image begins. Upon receiving any of the identifier information, the holographic LCD 13 determines the number of LCD panels needed for the display according to the corresponding number of the decomposed images belonging to the same holographic stereo image and needed to be displayed subsequently.

The holographic LCD 13 has multiple LCD panels. The holographic LCD 13 receives the synchronous signal sent by the synchronous signal generator 12, and controls each of the decomposed images displayed by the multiple LCD panels 13 in sequence. In a refresh period and at a certain time, only one LCD panel displays a frame of image decomposed and other LCD panels are in fully transparent state.

The number of the LCD panels of the holographic LCD 13 is no less than the number N of the decomposed images obtained by decomposing a holographic stereo image. In the case that the number of panels in the holographic LCD is definite, the number N of the decomposed images should be less than or equal to the number of the LCD panels in the holographic LCD.

The number of the multiple LCD panels of the holographic LCD 13 is selected as a multiple of 3. This is because three panels are combined as one "stereo unit", i.e. three panels can constitute a stereo space. In the simplest manner, a stereo picture can be displayed in three panels. In this manner, a holographic stereo image can be decomposed into a front layer, an intermediate layer and a back layer.

To improve the continuity and subtlety of a stereo picture, nine panels are selected.

The holographic LCD 13 determines the finish of projection of decomposed images obtained by decomposing a holographic stereo image according to the identifier information that indicates projection of decomposed images obtained by decomposing a holographic stereo image finishes and is carried in the synchronous signal, or determines the start of projection of decomposed images obtained by decomposing a holographic stereo image according to the identifier information that indicates the start of projection of decomposed images obtained by decomposing a holographic stereo image carried in the synchronous signal, and further determines the LCD panels for displaying the decomposed images, wherein, the number of the determined LCD panels is no less than the number N of the decomposed images obtained by decomposing the holographic stereo image to which the next decomposed images need to be displayed belongs.

If the holographic LCD 13 comprises more than N LCD panels, the holographic LCD 13 may choose N LCD panels therefrom to sequentially display the projected decomposed images when displaying the decomposed images projected by the holographic projection device 11. For example, if the holographic LCD 13 has determined in advance that the number of the decomposed images obtained by decomposing the holographic stereo image to be displayed is N, N panels can be selected from the multiple LCD panels thereof; if the holographic LCD 13 does not determine the number N of the decomposed images obtained by decomposing the holographic stereo image to be displayed, it is possible to sequentially employ each LCD panel to display the decomposed images starting from the first LCD panels each time when it is determined to start projection of the decomposed images obtained by decomposing a holographic stereo image.

When one LCD panel displays a decomposed image projected by the holographic projection device, other LCD panels of the holographic LCD 13 are all in the fully transmissive state. Furthermore, when the holographic projection device refreshes the decomposed image projected according to the refresh frequency, the LCD panel currently displaying decomposed image enters the fully transmissive state, and a LCD panel behind the LCD panel currently displaying decomposed image displays the refreshed decomposed image.

For example, the holographic LCD 13 determines the refresh frequency at which the holographic projection device 11 projects the decomposed images according to the received synchronous signal; controls the LCD panel_1 to display the decomposed image_1_1 projected by the holographic projection device 11; then controls the LCD panel_1 to enter the fully transmissive state at a frequency as same as the refresh frequency, then controls the LCD panel_2 behind the LCD panel_1 to display the decomposed image_1_2 projected by the holographic projection device 11, next controls the LCD panel_2 to enter the fully transmissive state at the frequency, and then controls the LCD panel_3 behind the LCD panel_2 to display the decomposed image_1_3 projected by the holographic projection device 11, and so on in this manner until displaying the decomposed images obtained by decomposing the currently projected holographic stereo image is finished.

When the holographic LCD 13 receives an identifier information that is carried by the synchronous signal and indicates the start of projection of the holographic stereo image or an identifier information that is carried by the synchronous signal and indicates the finish of projection of the holographic stereo image, it means that it is currently going to start projecting the decomposed images obtained by decomposing a new holographic stereo image and therefore, the holographic LCD 13 can re-control the LCD panel_1 to display the decomposed image_2_1 projected by the holographic projection device 11 and then control the multiple LCD panels to sequentially display the decomposed images in the above-mentioned manner. In this way, in the holographic LCD 13, N LCD panels sequentially displays from front to back the decomposed images obtained by sequentially decomposing a holographic stereo image, the position order of the N LCD panels that sequentially displays the decomposed images and the position order of the decomposed images of the holographic stereo image are the same, thus the N LCD panels is able to reflect the actual physical depth of the holographic stereo image. And moreover, if the frequency at which the N LCD panels sequentially display the decomposed images is no less than 46 Hz, it is possible to present to human eyes, a holographic three-dimensional image shown in the holographic LCD in a stereo image, to obtain a effect of displaying vividly a real naked eye three-dimensional image.

The Second Embodiment

The second embodiment of the present disclosure relates to the holographic LCD mentioned in the first embodiment. The holographic LCD can use a driving mode of Chip On Glass (COG) plus Gate On Array (GOA), i.e. the driving mode of COG+GOA, so that it is possible to obtain a more compact display panel structure and save the materials.

Figure 2:
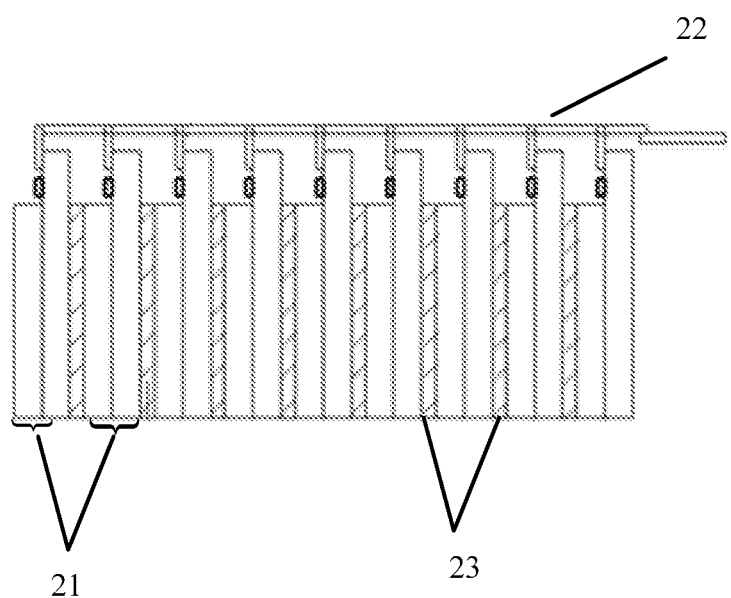
FIG. 2 is a structural diagram of a holographic LCD according to the second embodiment of the present disclosure.

FIG. 2 is a structural diagram of the holographic LCD according to the second embodiment of the present disclosure.

As illustrated in FIG. 2, the holographic LCD comprises multiple LCD panels 21 and a layer-by-layer scan synchronous driver circuit 22 which can be made by Printed Circuit Board (PCB).

The layer-by-layer scan synchronous driver circuit 22 determines the refresh frequency at which projecting the decomposed images obtained by a decomposing the holographic stereo image, and controls the multiple LCD panels to display the decomposed images in the sequence, and controls just one of the LCD panels to display the decomposed images and all the other LCD panels to be in the fully transmissive state, according to the refresh frequency, at a certain time in an refresh period.

Each panel in the multiple LCD panels 21 displays the decomposed images or enters the fully transmissive state under the control of the layer-by-layer scan synchronous driver circuit.

The multiple LCD panels 21 may be obtained by bonding multiple LCD panels with Optical Cement and Adhesives (OCA) in a non-gap lamination.

And moreover, each of the multiple LCD panels 21 may also be connected to the layer-by-layer scan synchronous driver circuit 22 respectively by a Flexible Printed Circuit Board (FPC).

The holographic LCD as illustrated in FIG. 2 works in following manner: the layer-by-layer scan synchronous driver circuit 22 receives the synchronous signal sent by the synchronous generator 12, and each panel in the multiple LCD panels 21 is controlled to respectively enter the fully transmissive state or the display state, to sequentially display the decomposed images projected by the holographic projection device 11.

For example, the holographic LCD according to the present disclosure is composed of three "stereo units", each of which is composed of three crystal liquid panels. That is, the display system is composed of nine liquid crystal panels in total.

To increase the actual depth between each decomposed images of a holographic stereo image, it is possible to increase the actual distance between the N-th LCD panel and the (N+1)-th LCD panel of the holographic LCD. Optionally, the holographic LCD also comprises light guide film plate 23.

The light guide film plate 23 is located between the adjacent LCD panels of the holographic LCD, i.e. between the n-th LCD panel and (n+1)-th LCD panel, and the light guide film plate can scatter the pictures projected onto the adjacent LCD panels to peripheral edges. On one hand, the light guide film plate increases the actual depth between each composed images of a holographic stereo image so that a better stereo display effect of the holographic stereo image on the holographic LCD can be achieved. On the other hand, since the light guide film plate may scatter the pictures obtained by projecting onto the adjacent panels to peripheral edges, it is possible to achieve a stereo picture that still has a good viewing effect when seen at a side viewing angle, that is, the best viewing angle of the stereo pictures are broadened, ultimately an stereo viewing angle of 180 degrees is achieved.

What needs to be explained is that the thickness of the light guide film plate 23 can be set according to actual requirements, for example, the degree of smoothness and fineness of the holographic stereo image.

The light guide film plate 23 and the LCD panel 21 can be non-gap bonded by OCA.

The LCD panel in the holographic LCD will be described in the following.

Figure 3:
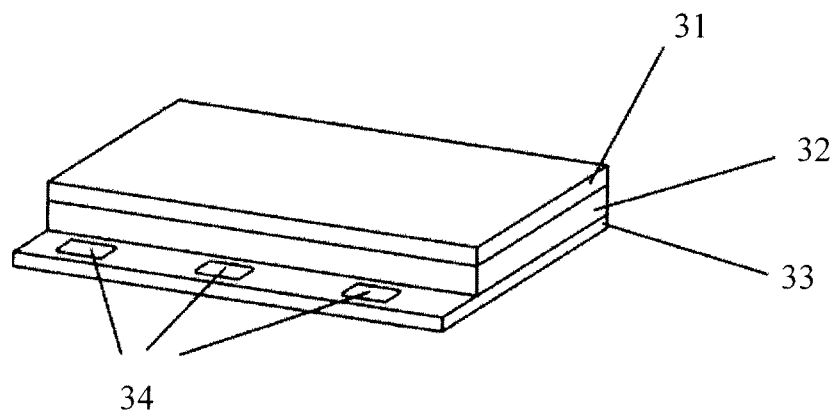
FIG. 3 is a structural diagram of any LCD panel of multiple LCD panels according to the second embodiment of the present disclosure.

FIG. 3 is a structural diagram of any LCD panel 21 of the multiple LCD panels 21 according to the second embodiment of the present disclosure. As illustrated in FIG. 3, the LCD panel 21 comprises a common driving electrode (Vcom) glass substrate 31, Thin Film Transistor (TFT) substrate 33, Driver Integrated Circuit (Driver IC) that drives the TFT substrate 33 and a liquid crystal layer 32 filled between the Vcom glass substrate 31 and the TFT substrate 33.

Figure 4:
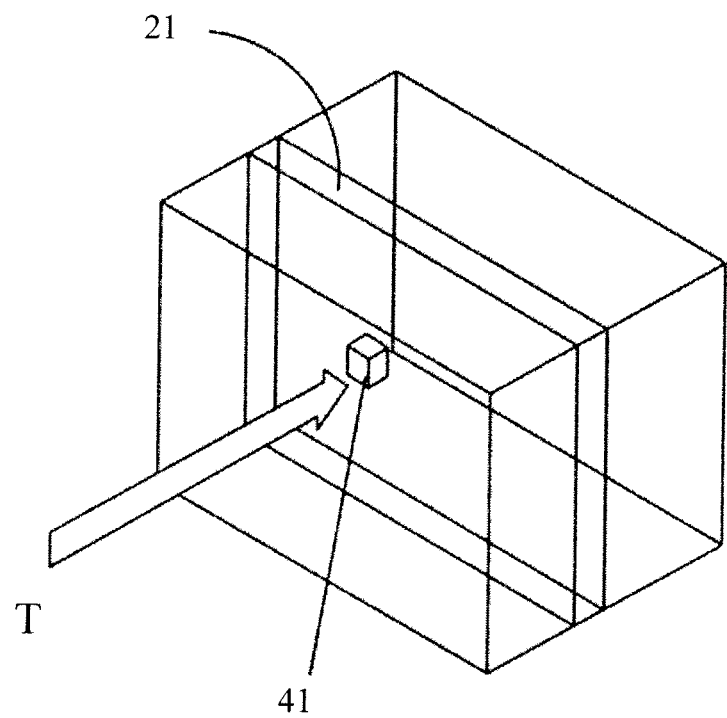
FIG. 4 is a schematic diagram of elements on a LCD panel according to the second embodiment of the present disclosure.

Any LCD panel 21 can be considered as a liquid crystal shutter and it can change from transparency to each imaging greyscale. Any LCD panel 21 can also be considered as a set of several basic units for constructing a stereo image. As illustrated in FIG. 4, under the illustrated light beam T forming the projected image, each of the basic unit 41 can be seen as filled with liquid crystal, such as cholesteric liquid crystal. In such cholesteric liquid crystal, long molecules are flat and are arranged parallel with each other in panels due to the interaction of the terminals. And the long axis thereof is in layer plane, with arrangement of molecules in-plane being similar to those in nematic liquid crystal, while the orientations of the long axis of molecules in two adjacent layers twist a certain angle regularly with respect to each sequentially due to action of optical active groups extending outside the layer plane. Such molecules are accumulated layer by layer so that a spiral structure is formed.

Figure 5A:
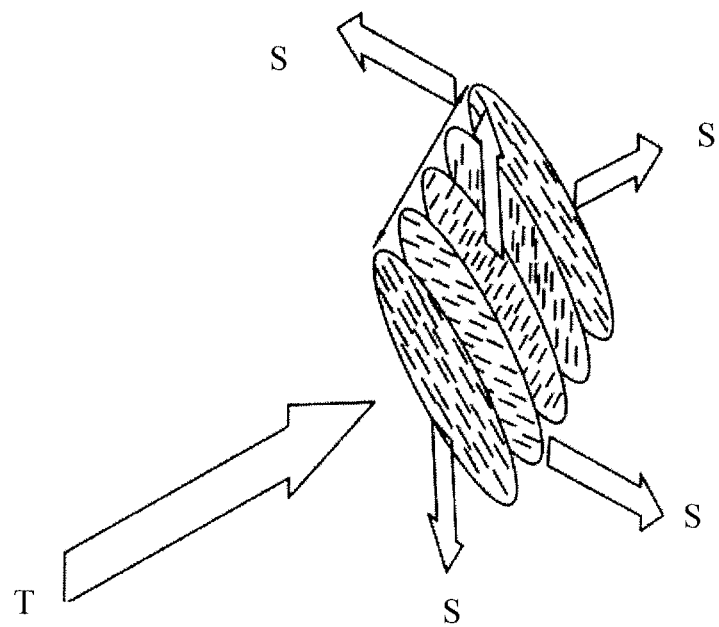
FIG. 5a is a schematic diagram of any of the LCD panels according to the second embodiment of the present disclosure in a power-off state that scatters light in different directions.
Figure 5B:
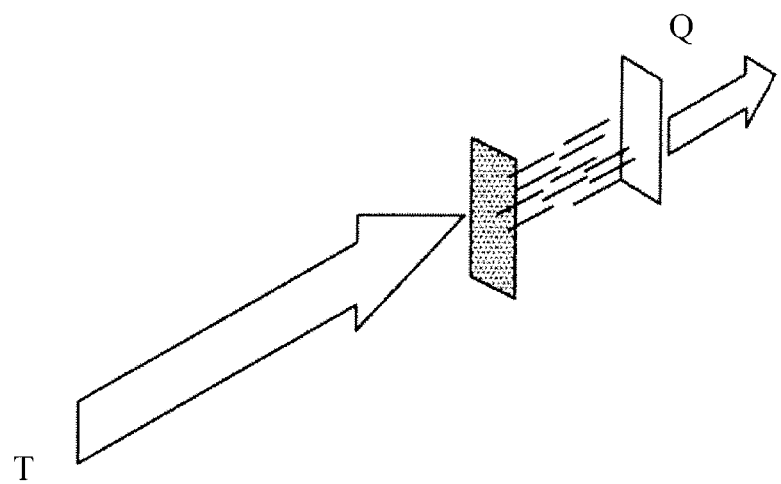
FIG. 5b is a schematic diagram of any of the LCD panels according to the second embodiment of the present disclosure in a power-on state that transmits light.

When the LCD panel is in the power-off state, the light projected to the LCD panel 21 by the holographic projection device 11 may be diffusively reflected, so that the light may be scattered in different directions, as illustrated in FIG. 5a. Under radiation of the light ray T forming the projected image, liquid crystal in the LCD panel scatter light in different directions (in FIG. 5a, the scattering direction is shown as S), so that the projected decomposed images can be displayed on the LCD panel 21. When the LCD panel 21 is in the power-on state, light rays projected onto the LCD panel 21 by the holographic projection device 11 directly transmit through the basic units in the LCD panel 21 (in FIG. 5b, the transmitting direction is shown as Q), as illustrated in FIG. 5b. Light rays T project onto the basic units of the next LCD panel 21. If the next LCD panel 21 is powered off, light diffusion reflection may occur in the next LCD panel 21 with light being scattered in different directions, i.e. displaying the decomposed image projected by the holographic projection device 11 on the next LCD panel 21. Otherwise, light rays T keep propagating toward the next LCD panel 21.

Figure 6:
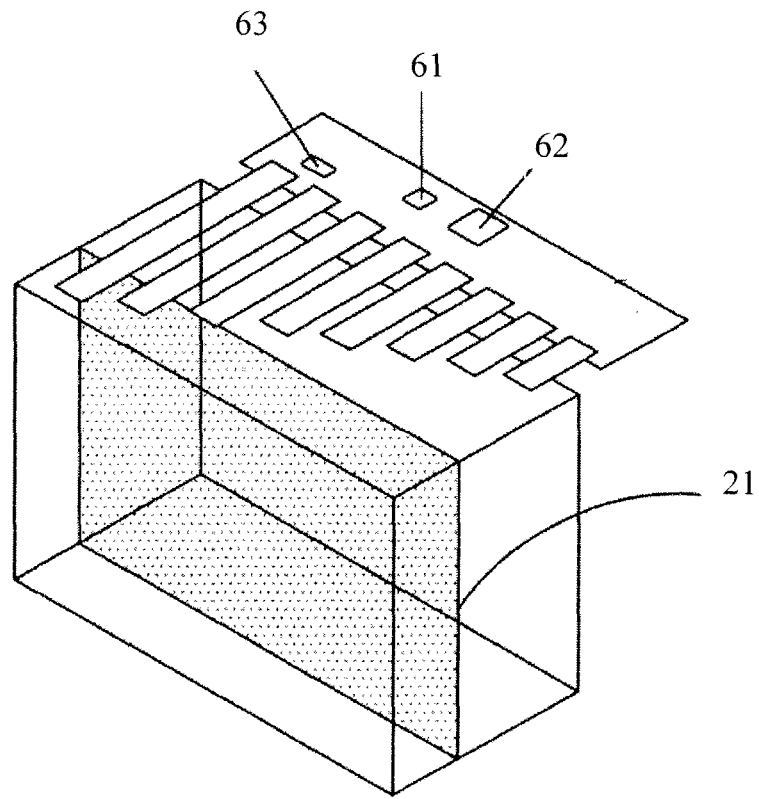
FIG. 6 is a structural diagram of a layer-by-layer scan synchronous driver circuit and one output port of its level shifter connected to a panel of the LCD panels according to the second embodiment of the present disclosure.

As illustrated in FIG. 6, the layer-by-layer scan synchronous driver circuit 22 may comprise a synchronous signal receiver 61, a Timing Controller (TCON) 62, a Level Shifter (LS) 63, and other component for controlling the imaging of the LCD panel 21.

The synchronous signal receiver 61 receives synchronous signals sent by the synchronous signal generator 12, making displaying the decomposed images by the holographic LCD and projecting the decomposed images by the holographic projection device synchronized.

The TCON 62 generates a control signal of whether each panel of the LCD panels is powered on or not according to the refresh frequency, wherein, the LCD panels powered on are in the fully transmissive state, while the LCD panel powered off can display the projected decomposed images.

The LS 63 controls each panel of the LCD panels powered-on and powered-off according to the control signal generated by the TCON 62.

In an example, if the LCD panel has a GOA unit, the LS 63 can control each panel of the LCD panels powered-on or powered-off depending on whether the GOA unit is opened or not.

For simplicity, FIG. 6 only depicts the circumstance that one output port of the LS 63 is connected to one of the LCD panels. By controlling the LCD panel illustrated in FIG. 6 to be powered-on or off based on the control signal, the LS 63 controls the LCD panel to enter a display state (i.e. the state of displaying the decomposed images projected by the holographic projection device 11), or to enter the fully transmissive state.

The number of the output ports of the LS 63 is the same as the number of LCD panels constituting the holographic LCD, with each output port used for controlling whether a LCD panel connected thereto is powered on.

Figure 7:
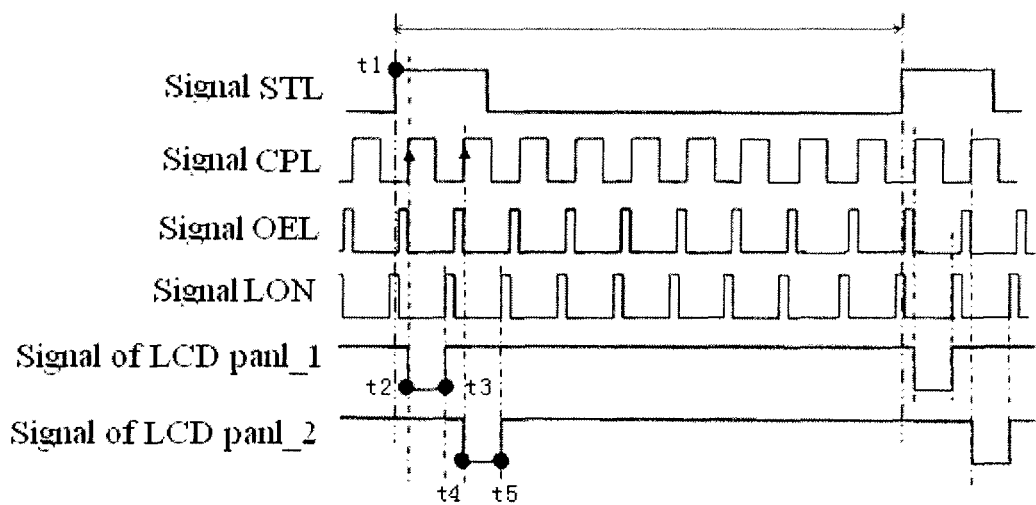
FIG. 7 is a timing chart of a control signal generated by a timing controller and a timing chart of whether or not the LCD panel is powered on according to the second embodiment of the present disclosure.

FIG. 7 is a diagram of control signals generated by the TCON 62. For example, the LCD panel_1 and the LCD panel_2 of the holographic LCD displays the decomposed images projected, and the layer-by-layer scan synchronous driver circuit 22 controls the multiple LCD panels 21 according to the signal view illustrated in FIG. 7 in the following process:

After generating a control signal, TCON requires the LS 63 to control the LCD panel to be powered on or off according to the control signal. Because a gate line of each LCD panel is connected in parallel to a control bus, the LS 63 can control whether the LCD panel is powered on via the control bus.

The Control Signal of the TCON Comprises

A start layer (STL) signal indicating that layer-by-layer scan starts at the rising edge;

A clock pulse layer (CPL) signal which indicates that the LCD panel is powered off at the rising edge (i.e. the driving voltage of the LCD panel is off). That is, the CPL signal triggers the LCD panel to be powered off at the rising edge, and then the LCD panel may display the decomposed images projected;

An output enable layer (OEL) signal which is effective at low level. That is, at the falling edge of OEL signal, the LCD panel is powered off, and then the LCD panel can display the decomposed images projected;

A layer ON (LON) signal which is effective at high level. That is, at the rising edge, the LCD panel is powered on, and then the LCD panel goes into the fully transmissive state.

Supposing the diagram of the control signal is shown in FIG. 7, according to the control signal, the LS 63 controls whether the LCD panel_1 and LCD panel_2 are powered on or not as below:

[1] At time t1, the rising edge of STL signal arrives, the layer-by-layer scan starts and the LCD panel_1 and the LCD panel_2 starts are scanned sequentially.

At this time, each LCD panel is in the fully transmissive state. The layer-by-layer scan synchronous driver circuit 22 waits until the condition for triggering the N-th LCD panel to start displaying is met, triggers the N-th LCD panel to start the displaying, and in the period of the Nth LCD panel in the displaying state, the panel-by-panel scan synchronous driver circuit 22 controls each LCD panel to enter the displaying state to display the decomposed images projected thereon by the projection device 11.

The condition for triggering the Nth LCD panel to start displaying is: the arrival of the N-th CPL signal after the rising edge of the STL signal.

The period in which the Nth LCD panel is in the displaying state is: the period between time K1 and time K2, the time K1 being the time that the falling edge of the first OEL signal arrives after the rising edge of the N-th CPL signal, the time K2 being the time when the rising edge of the first LON signal arrives after the rising edge of the Nth CPL signal.

Taking the first LCD panel, i.e. the LCD panel_1, as an example, the time K1 is the time t2 in FIG. 7 and the time K2 is the time t3 in FIG. 7.

[2] At time t2, (t2 is after the time t1), the first rising edge of CPL signal arrives. At this time, the falling edge of the OEL signal arrives and the LON signal is at a low level, and therefore, the LCD panel_1 is powered off (i.e. driving voltage is off, as shown in the form of low level in FIG. 7) so that it is possible for the light projected by the holographic projection device 11 to be diffusely reflected on the LCD panel_1, that is, to display the decomposed images projected by the holographic projection device 11.

[3] Before time t3 arrives, the LCD panel_1 continues to display the decomposed images projected by the holographic projection device 11.

[4] When time t3 arrives, the rising edge of the LON signal arrives, which making the LCD panel_1 go into the fully transmissive state (i.e. the driving voltage is on, as shown in the form of high level in FIG. 7). At this time, the condition for the displaying state is not completely met, and thus no LCD panel displays the decomposed images projected by the holographic projection device 11 and before the condition for the displaying state is completely met, all the LCD panels are in the fully transmissive state.

[5] When time t4 arrives, the condition for the displaying state is completely met, and thus the LCD panel_2 is powered off (i.e. the driving voltage is off, as shown in the form of low potential in FIG. 7) so that it is possible for the light projected by the holographic projection device 11 to be diffusely scattered onto the LCD panel_2, that is, to display the decomposed images projected by the holographic projection device 11.

[6] Before time t5 arrives, the LCD panel_2 continues to display the decomposed images projected by the holographic projection device 11.

[7] When time t5 arrives, the rising edge of the LON signal arrives, which making the LCD panel_2 enter into the fully transmissive state (i.e. the driving voltage is on, as shown in the form of high level in FIG. 7). In this way, N frames of decomposed images by decomposing the holographic stereo image are displayed respectively by N LCD panels to achieve the aim of displaying the holographic stereo image in stereo.

In the solution of the present embodiment, the signal frequency of each signal contained in the control signal needs to be configured to match with the signal frequency of synchronous signal generated by the synchronous signal generator 12, so that the frequency of each LCD panel in the holographic LCD displaying the decomposed images is the same as the frequency of the holographic projection device 11 refreshing the decomposed images.

The Third Embodiment

Figure 8:
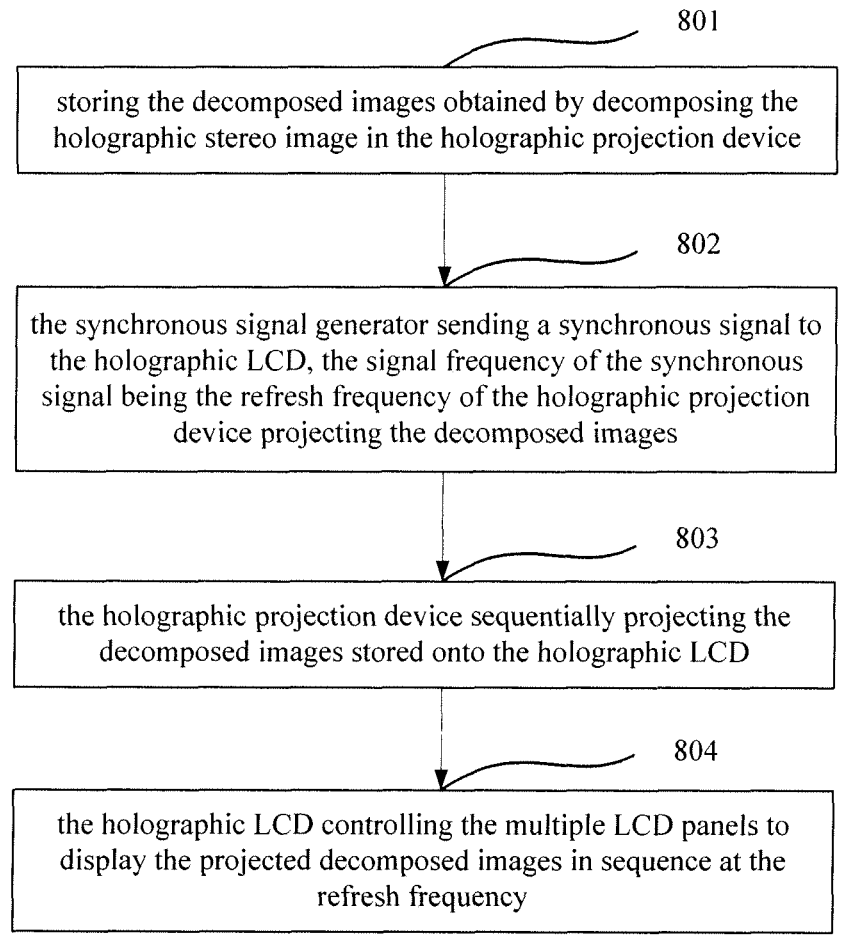
FIG. 8 is a flow chart of a holographic LCD stereo display method according to the third embodiment of the present disclosure.

FIG. 8 is a flow chart of the holographic LCD stereo displaying method according to the third embodiment of the present disclosure. As illustrated in FIG. 8, the stereo displaying method can be a working flow of the holographic LCD stereo display system pertained to the first embodiment, and mainly comprises the following steps:

Step 801: storing the decomposed images obtained by decomposing the holographic stereo image in the holographic projection device.

Step 802: the synchronous signal generator sending a synchronous signal to the holographic LCD, the signal frequency of the synchronous signal being the refresh frequency of the holographic projection device projecting the decomposed images obtained by decomposing the holographic stereo image.

The holographic LCD may be the holographic LCD according to the first or the second embodiment.

Step 803: the holographic projection device sequentially projecting the decomposed images stored onto the holographic LCD.

What needs to be explained is that the number of the LCD panels of the holographic LCD is no less than the number N of the composed images obtained by decomposing the holographic stereo image. If the number of the LCD panels in the holographic LCD is more than N, it is possible to select N LCD panels to display the decomposed images projected.

The synchronous signal can carry an identifier information that indicates the finish of projecting the holographic stereo image or an identifier information that indicates the start of projecting the holographic stereo image, for the holographic LCD to determine that it is currently needed to start projecting a new holographic stereo image, and further determine the LCD panel to be used.

Step 804: the holographic LCD controlling the multiple LCD panels to display the projected decomposed images in sequence at the refresh frequency.

Specifically, upon receiving any of the identifier information, the holographic LCD determines the corresponding number of the LCD panels according to the number of the decomposed images belonging to the same holographic stereo image that needed to be displayed subsequently, and controls the determined LCD panels to display the projected decomposed images in sequence according to the refresh frequency.

The holographic LCD controlling the determined LCD panel to display the projected decomposed images in sequence comprises: controlling one of the LCD panels to display the decomposed images projected by the holographic projection device, while controlling other LCD panels of the holographic LCD to be in the fully transmissive state, and then the holographic projection device refreshes the decomposed images projected according to the refresh frequency, the holographic LCD controls the currently displayed decomposed images of the LCD panel to go into the fully transmissive state, and controls next LCD panel behind the currently displayed decomposed images of the LCD panel to display the refreshed decomposed image.

The holographic LCD can control the LCD panel to be powered off in order to display the decomposed images, or control the LCD panel to be powered on to go into the fully transmissive state.

For the decomposed images obtained by decomposing each holographic stereo image, they can be sequentially displayed on the holographic LCD by performing the method of steps 802 to 804.

Next, the effect of displaying a three-dimensional stereo image on the holographic LCD to which the respective embodiment of the present disclosure is applied will be explained through a set of intuitive diagrams.

Figure 9:
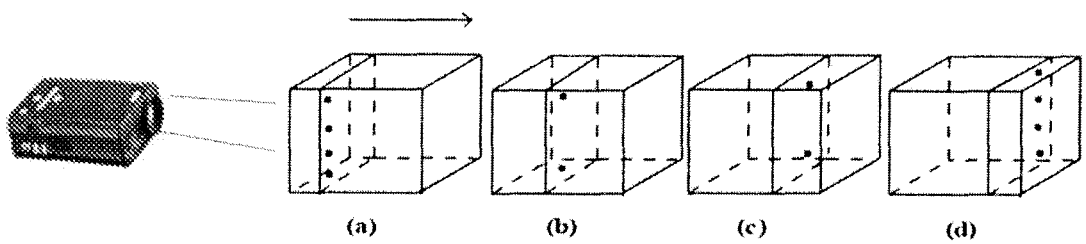
FIG. 9 is a diagram of displaying in a holographic LCD each of the four decomposed images formed by decomposing a holographic stereo image according to the third embodiment of the present disclosure.

As illustrated in FIG. 9, (a) to (d) are diagrams of displaying each of the four decomposed images obtained by decomposing a holographic stereo image in the holographic LCD according to the present disclosure, as can be seen from the diagram:

When the first decomposed image is projected onto the holographic LCD, the LCD panel_1 displays the first decomposed image, while other LCD panels are in the fully transmissive state (not illustrated); when the second decomposed image is projected onto the holographic LCD, the LCD panel_1 is in the fully transmissive state, while the LCD panel_2 behind the LCD panel_1 displays the second decomposed image and at this time, all the LCD panels other than the LCD panel_2 are all in the fully transmissive state. In this way, up to four decomposed images are sequentially displayed on the LCD panel_1 to the LCD panel_4.

If the frequency at which the holographic LCD displays the decomposed images is no less than 46 Hz, the images displayed by the four LCD panels will build a stereo image in human brain due to the visual persistence of the human eyes.

The above embodiments are only for explaining and not intended to limit the present invention, and the common person skilled in the related art can make various changes and modification without departing the spirit and scope of the present invention. Therefore, all the equivalent solutions fall into the protection scope of the present invention, which should be defined by the attached claims.

The invention claimed is:

1. A stereo display method for a holographic liquid crystal display (LCD), the method comprising:

receiving, by the holographic LCD, a synchronous signal, a signal frequency of the synchronous signal being a refresh frequency of projecting decomposed images obtained by decomposing a holographic stereo image;

decomposing, by a holographic projection device, the holographic stereo image to obtain the decomposed images;

projecting, by the holographic projection device, the decomposed images onto the holographic LCD sequentially; and controlling, by the holographic LCD, multiple LCD panels to sequentially display the projected decomposed images, according to the refresh frequency, wherein the synchronous signal carries identifier information that indicates completion of projecting all the decomposed images obtained by decomposing the holographic stereo image, or identifier information that indicates initiation of projecting the decomposed images obtained by decomposing the holographic stereo image, and wherein the controlling, by the holographic LCD, the multiple LCD panels to sequentially display the decomposed images projected according to the refresh frequency comprises:

upon receiving any of the identifier information, determining, by the holographic LCD, a corresponding number of the LCD panels based on a number of the decomposed images that need to be displayed subsequently and belonging to the same holographic stereo image; and controlling, by the holographic LCD, the determined LCD panels to display in sequence the decomposed images projected, according to the refresh frequency.

2. The method according to claim 1, wherein the controlling, by the holographic LCD, the determined LCD panels to display in sequence the decomposed images projected comprises:

controlling, by the holographic LCD, one of the multiple LCD panels to display the decomposed image projected by the holographic projection device while controlling others of the multiple LCD panels of the holographic LCD to be in a fully transmissive state;

refreshing, by the holographic projection device, the decomposed images projected according to the refresh frequency; and controlling, by the holographic LCD, the LCD panel which is currently displaying the decomposed image to enter the full transmissive state, and controlling a layer of the LCD panel behind the LCD panel which is currently displaying the decomposed image to display the decomposed image refreshed.

3. The method according to claim 1, wherein the refresh frequency is no less than 46 Hz.

4. The stereo display method according to claim 1, wherein a number of the multiple LCD panels is greater than a number of the decomposed images.

5. A stereo display system for a holographic LCD, the system comprising:

a holographic projection device which stores decomposed images obtained by decomposing a holographic stereo image, and projects sequentially the decomposed images; and a holographic LCD device having multiple LCD panels, for controlling the multiple LCD panels to display in sequence the decomposed images projected, and in a refresh period, controlling only one panel of the multiple LCD panels to display the decomposed image projected and other panels of the multiple LCD panels to enter a fully transmissive state, according to a refresh frequency of a synchronous signal, at which the holographic projection device projects the decomposed images, wherein a number of the multiple LCD panels of the holographic LCD is not less than a number of the decomposed images obtained by decomposing a holographic stereo image, wherein the synchronous signal carries identifier information that indicates completion of projection of all the decomposed images obtained by decomposing the holographic stereo image, or identifier information that indicates initiation of projection of the decomposed images obtained by decomposing the holographic stereo image, and wherein upon receiving any of the identifier information, based on the number of the decomposed images belonging to the same holographic stereo image that needs to be displayed subsequently, the holographic LCD determines a same number of the LCD panels as the number of the decomposed images and controls the determined LCD panels to display the decomposed images to be projected next.

6. The stereo display system according to claim 5, wherein a number of the multiple LCD panels is greater than a number of the decomposed images.

* * * * *